UNITED STATES PATENT OFFICE.

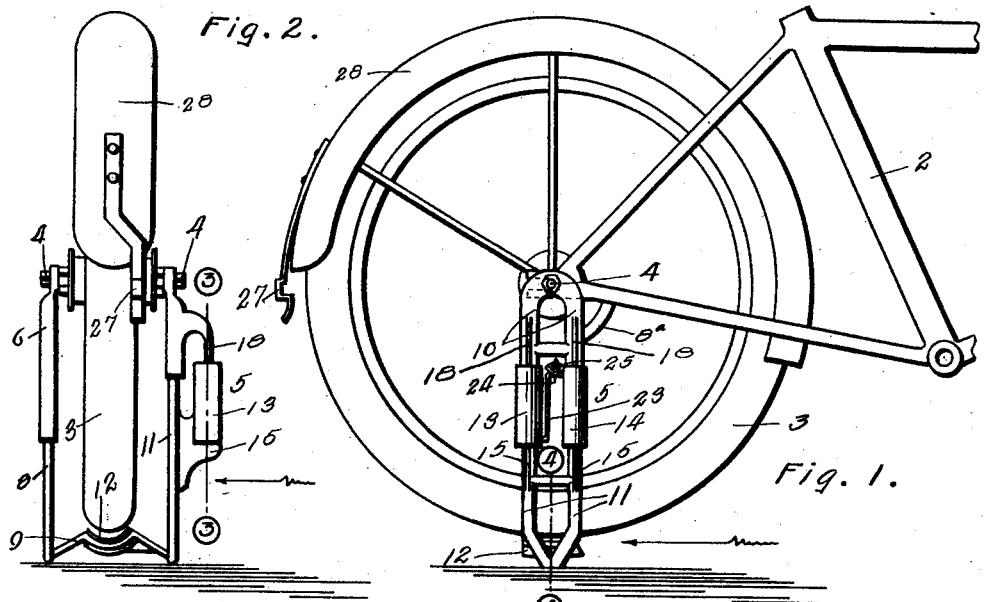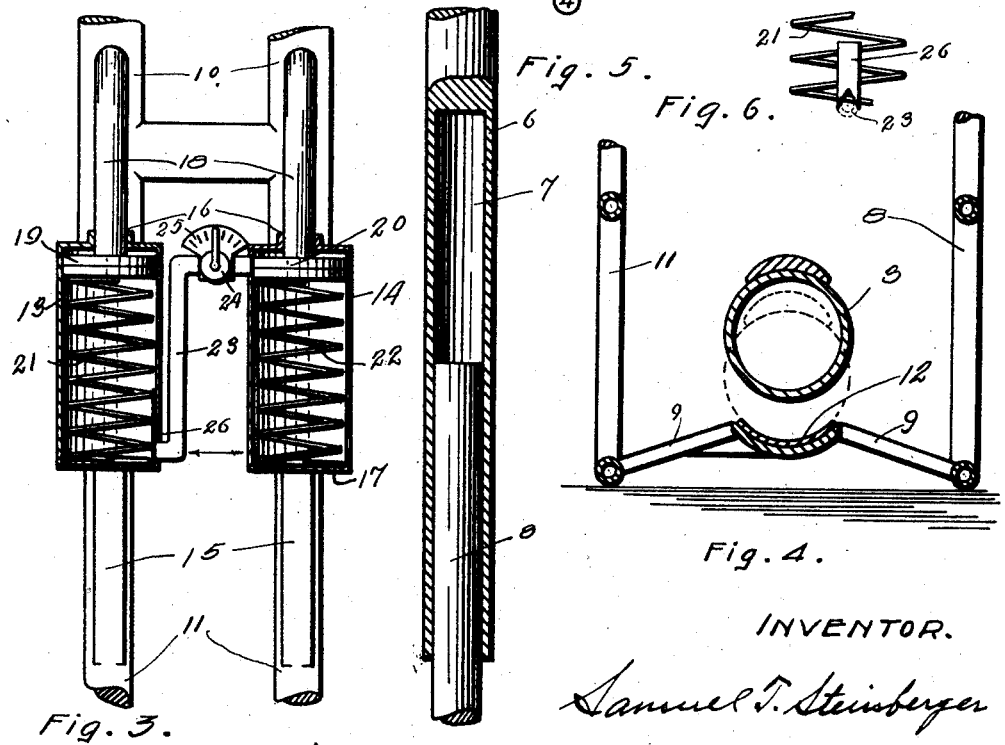

SAMUEL T. STEINBERGER, OF PEORIA, ILLINOIS.

MOTOR-CYCLE STAND.

1,039,838.  Specification of Letters Patent. Patented Oct. 1, 1912.

Application filed July 1, 1911.  Serial No. 636,532.

*To all whom it may concern:*

Be it known that I, SAMUEL T. STEINBERGER, a citizen of the United States, residing at Peoria, in the county of Peoria and State of Illinois, have invented certain new and useful Improvements in Motor-Cycle Stands, of which the following is a specification.

My invention relates to motor cycle stands.

More particularly my invention relates to a telescoping section stand; means for controlling the telescoping relation, and a shoe at the base of the stand.

The purpose of my invention is to provide a stand to normally support the weight of the wheel so that parts thereof will telescope relatively under the weight of the rider under a controlled tension to permit the wheel to engage a shoe at the base of the stand to cause a forward impetus to be given to the motor cycle and to cause the stand itself to be thrown, by the momentum imparted thereto, by the movement of the wheel alone or by auxiliary appliances, to cause the stand to be lodged in its support adjacent the mud guard.

My invention embraces a telescoping sectional stand made in any desired form, a shoe at the base thereof, and means for controlling the telescoping action of the parts of the stand.

In the drawings—Figure 1 is a side elevation of a portion of a motor cycle frame and a wheel, showing my invention applied thereto; Fig. 2 is a rear view of a motor cycle showing my invention applied; Fig. 3 shows in elevation telescoping portions of the stand, the cylinder portions thereof being shown in section on the line 3—3 of Fig. 2; Fig. 4 is a sectional view on the line 4—4 of Fig. 1 and shows the relative position of the wheel to the shoe when supporting the motor cycle only and when under the weight of the rider; Fig. 5 shows parts of the stand, the tube portion thereof being broken away to show the relation of the parts. Fig. 6 is a detail view showing a portion of a spring cut off associated therewith.

To the extent of my knowledge and according to my information, stands have heretofore been employed to support motor cycles at starting that will permit the engine to be started while the machine is at rest. In so starting, the rider mounts the machine, starts the motor, then dismounts and disengages the stand or swings it to its supported position adjacent the mud guard, then, after a manually induced momentum is imparted to the wheel, the rider mounts and the clutch is thrown in to propel the vehicle.

So far as I know, I am the first to provide means for controlling the start from a stationary shoe, a controlled lowering of the motor cycle wheel to engage the shoe and by the action resulting from the engagement between the wheel and the shoe, the establishment of a temporary inclined plane to impart the initial impetus to the wheel that is necessary in starting.

Referring to the drawings, 2 indicates the usual frame; 3 refers generally to the motor cycle wheel; 4 refers to the spindle or extension from the wheel axle proper to which ordinarily stands are pivoted.

5 refers generally to the motor cycle stand.

6 is a frame part of the stand adapted to be pivoted to spindle 4, said frame part being provided with an interior opening 7 (see Fig. 5).

8 is a frame rod having telescoping relation with the interior opening 7 of frame part 6, said rod being connected with the base or cross connecting portion 9 of the stand.

10 is a frame part connected in the same manner with spindle 4 as frame piece 6, and provided with a similar interior opening.

8ª is an arm connected with frame 2 and adapted to bear against frame part 10 as a brace for the latter in supporting the rear portion of the motor cycle.

11 are rods or bars, the upper portion thereof having the same character of telescoping relation with frame part 10 as rod 8 has with frame part 6, the lower portion thereof being connected with the base 9.

12 is a shoe which may be in any desired form in cross section to best engage the tire of wheel 3, and may be of any length desired, and is preferably formed with a forward incline at its forward end to minimize as much as possible the jar attending the passage of the wheel from the shoe to the ground.

For the purpose of providing for controlled telescoping relation between the sections of the stand, I have provided cylinders 13 and 14, each connected with rods or bars 11 by means of brackets as 15 and each provided with a piston opening as at 16, and cylinder 14 provided with air outlet opening 17.

18 are piston rods having a fixed connection with frame part 10.

19 and 20 are piston heads adapted to reciprocate respectively in cylinders 13 and 14.

21 is a coil spring in cylinder 13 and 22 is a coil spring in cylinder 14.

23 is a connecting duct or pipe from the opening into the lower part of cylinder 13 into the upper part of cylinder 14. Normally enough liquid (preferably oil) is supplied to the controlled mechanism to fill cylinder 13, duct 23, and the small space above piston head 20 in cylinder 14.

24 is a check valve designed to be operated by any suitable means within convenient reach of the motor cycle rider, to cut off or permit the flow of liquid from one cylinder to the other, and to control the flow therebetween.

25 is a graduated plate adapted as an indicator, for setting the valve to control the flow of liquid through duct 23 for the purpose of equalizing the descent of the wheel under varying weights of riders. 26 is also a control valve, the same being adapted to be connected to one of the leaves of coil spring 21 and is formed V-shaped at its lower end, and adapted to bear over the inlet into duct 23. This valve is provided as a general control, independent of valve 24, which will prevent a too violent or quick descent of the motor cycle, as it will gradually reduce the size of the inlet opening into duct 23 as piston 19 descends.

In the operation of the device, the parts thereof are designed to be assembled relatively in substantially the positions shown in the drawings, and in a position to support the motor cycle, substantially as shown in Fig. 1. The valve 24 having first been turned to cut off the flow between cylinders 13 and 14, the rider may mount the motor cycle and start his engine. Then, by turning valve 24 to permit a flow between cylinders 13 and 14, the combined weight of the motor cycle and the rider will cause the piston heads 19 and 20 to descend from their normal position shown in Fig. 3, respectively in cylinders 13 and 14, under the tension of springs 21 and 22, and against the frictional resistance of liquid in cylinder 13 passing through duct 23 into cylinder 14, and the resistance of the gradual closing of the valve 26. The resistance of the gradually closing valve will, according to the setting of valve 24, be greater or less, according to the weight of the rider. The wheel will descend until it strikes shoe 12 and the revolution of the former under the force of the motor will cause the wheel to be forwardly projected, passing from the shoe to the ground. As soon as the wheel releases the shoe, and strikes the ground, the cycle stand frame will be free to move upon its pivot and the frictional engagement between the wheel and shoe will continue long enough under the frictional resistance of the liquid passing from cylinder 14 through duct 23, to cause the stand to be turned with the wheel until it engages stand lock 27. When the stand is relieved from the weight of the machine and the rider, the springs 21 and 22 will cause the lower portion of the frame and cylinders to be moved until the piston heads are in the normal position shown in Fig. 3, at which time the parts of the device are in the proper relative position to allow the valve to be closed, with the stand elongated to its proper supporting form. The valve need not be closed until it is again desired as a support for the motor cycle. In general and ordinary use, the valve 26 will control the flow between the cylinders 13 and 14, therefore in such general usage, valve 24 need only be used as a complete cut-off or entire opening of communication between the respective cylinders.

I have described one form of embodiment of my invention but obviously it may be differently formed and the arrangement of the parts modified, and the same or substantially the same results attained. I therefore desire to claim all embodiments of my invention that legitimately fall within the scope of the same.

What I claim is:—

1. In a motor cycle stand adapted for pivotal connection with the motor cycle, in combination, frame parts relatively reciprocally connected, a shoe supported on the stand, and means connecting the telescoping sections under yielding tension to facilitate the lowering of the wheel under the weight of the rider into contact relation with the shoe.

2. In a motor cycle stand, in combination, relatively telescoping frame parts, a shoe on the stand, means interposed and connecting the telescoping sections in yielding relation, to facilitate the depression of the wheel into contact relation with the shoe, and means for fixing said frame parts against telescoping action under the weight of the rider.

3. In a motor cycle stand, in combination, telescoping frame parts, a shoe supported in connection with the stand, means connecting the telescoping frame parts in a yielding relation, comprising a pair of pistons provided with piston heads and connected with one set of frame parts, a primary and secondary cylinder, the former adapted to be filled with liquid below the cylinder head, the latter adapted to receive the discharge of liquid from the former above the cylinder head, a duct connecting the lower portion of the primary cylinder with the upper portion of the secondary cylinder above the piston head and a valve in the duct to control the flow of liquid from one cylinder to the other.

4. In a motor cycle stand, in combination, telescoping sections, a shoe, means for connecting the stand sections in a yielding compressible relation comprising a pair of pistons, a primary and a secondary cylinder, the former adapted to be filled with liquid below the piston head and the latter adapted to receive the liquid that is expelled under compression from the primary cylinder, a duct communicating with the lower portion of the primary cylinder and with the secondary cylinder above the piston head, a valve for controlling the flow between the cylinders and springs compressible and expansible with the telescoping movement of the sections of the stand, whereby as the motor cycle wheel moves to its contact with the shoe, the springs will be compressed and when the stand is relieved from the weight of the rider, the springs will expand and force the stand to the limit of its extended position.

5. In a motor cycle stand adapted for pivotal connection with a motor cycle body, in combination, telescoping frame parts, a shoe connected with the frame and formed with an incline at its front end, means for connecting the telescoping parts in a yielding relation under the weight of the rider and means for fixing said parts relatively against telescoping movement, whereby the motor cycle frame may be mounted by the rider and the telescoping parts being fixed relatively will support a portion of the motor cycle frame and the rider in a fixed position, while the motor is being started, then by releasing the connection between the telescoping parts the weight of the rider will cause the wheel to be gradually depressed until it contacts with the shoe and the turning of the wheel will move the motor cycle forward until it is disengaged from the support.

6. In a motor cycle stand adapted for pivotal connection with the rear portion of a motor cycle, in combination, telescoping frame parts, a shoe connected with the stand, means for fixing the telescoping parts relatively in a non-telescoping relation, means for connecting the telescoping parts under yielding tension to permit the parts of the stand to telescope relatively under the weight of the rider, and means interposed between telescoping frame parts to expand the stand to its normal extended condition when relieved of the rider's weight.

7. In a motor cycle stand adapted for pivotal connection with the rear portion of the motor cycle, in combination, telescoping sections, a shoe connected with the lower portion of the stand, means connecting the telescoping sections under yielding tension, comprising a pair of pistons, a primary and a secondary cylinder, the former adapted to be filled with liquid below the piston head, and the latter to receive the flow of liquid from the primary chamber and provided with an air outlet below the piston head, a duct communicating with the lower portion of the primary cylinder and with the secondary cylinder at a point above the piston head, a check valve in the connecting duct under the control of the operator, coil springs within the respective cylinders compressible under the movement of the piston heads actuated by the weight of the rider, and expansible when the weight is removed to extend the frame.

8. In a motor cycle stand adapted for pivotal connection with the rear portion of the motor cycle, in combination, telescoping sections, a shoe connected with the lower portion of the stand, means connecting the telescoping sections under yielding tension, comprising a pair of pistons, a primary and a secondary cylinder, the former adapted to be filled with liquid below the piston head, and the latter to receive the flow of liquid from the primary chamber and provided with an air outlet below the piston head, a duct communicating with the lower portion of the primary cylinder and with the secondary cylinder at a point above the piston head, a check valve in the connecting duct under the control of the operator, coil springs within the respective cylinders compressible under the movement of the piston heads actuated by the weight of the rider, and expansible, when the weight is removed, to extend the frame, and a check valve connected with the spring in the primary chamber and movable therewith to gradually close the opening into the outlet duct as the spring is compressed and to open the duct when the spring is expanded.

In testimony whereof I have affixed my signature in presence of two witnesses.

SAMUEL T. STEINBERGER.

Witnesses:
MARY E. COMEGYS,
W. V. TEFFT.

---

Copies of this patent may be obtained for five cents each, by addressing the "Commissioner of Patents, Washington, D. C."